Inventor
Maurice Barry Eaton

By: Scrivener and Parker
Attorneys

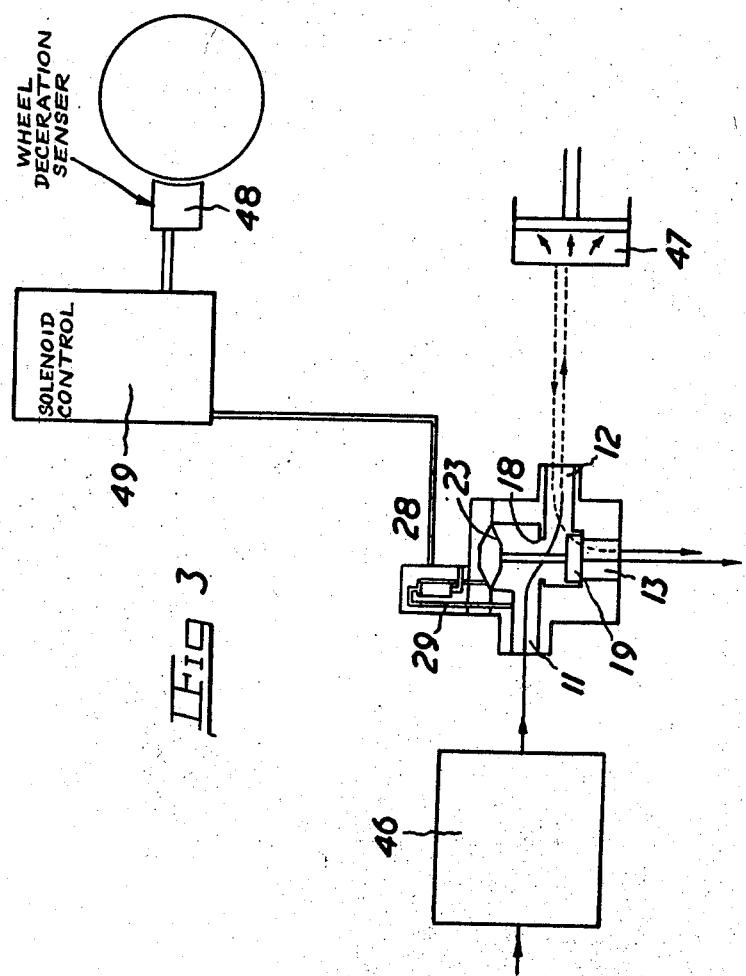

3,188,148
FLUID FLOW CONTROL VALVE
Maurice Barry Eaton, Kings Norton, Birmingham, England, assignor to Girling Limited, Birmingham, England, a British company
Continuation of application Ser. No. 275,095, Apr. 23, 1963. This application Nov. 16, 1964, Ser. No. 414,490
6 Claims. (Cl. 303—21)

This application is a continuation of my prior application, Serial No. 275,095 filed April 23, 1963.

This invention relates to improvements in valves for the control of fluid under pressure and more particularly to a valve adapted to control the flow from a source of fluid under pressure alternatively to a slave cylinder or the like, or to exhaust.

In a valve according to our invention, a valve head is adapted to engage alternatively with aligned seatings in a valve body located respectively between inlet and outlet passages and between the outlet passage and a further passage or port, and the valve head is provided on one or each side with a shroud or extension which is of a diameter less than that of the seating with which that side of the head co-operates, so that the shroud or extension enters the valve seating and restricts the flow of fluid through it before the valve closes.

The further passage or port referred to may lead to exhaust or atmosphere or to a fluid-pressure actuator.

The position of the valve head is conveniently controlled by a diaphragm or piston which is directly exposed on one side to the inlet pressure and is exposed on the other side to the pressure in a chamber connected to the inlet through a passage controlled by a pilot valve which may be operated by a solenoid and which is adapted to connect the chamber alternatively to the inlet or to atmosphere.

According to a further feature of our invention the axial lengths of the shrouds or extensions on the valve head are such that the inlet is restricted or substantially closed before the connection between the outlet and the further passage or port is opened.

Our improved valve is suitable for use in systems for rail vehicles incorporating means for preventing slipping of the wheels, a device sensitive to the rate of deceleration of a wheel being provided to relieve the pressure in a fluid pressure brake-actuating cylinder. In such a braking system, it is essential that the relief of the pressure should be effected very rapidly, normally in one third of a second or less, in order to prevent the wheels from being locked while the vehicle is still in motion.

One form of control valve in accordance with our invention and a modification thereof are illustrated by way of example in the accompanying drawings in which:

FIGURE 3 is a diagram of a layout of a fluid-pressure braking system incorporating a control valve in accordance with our invention.

Figure 1:
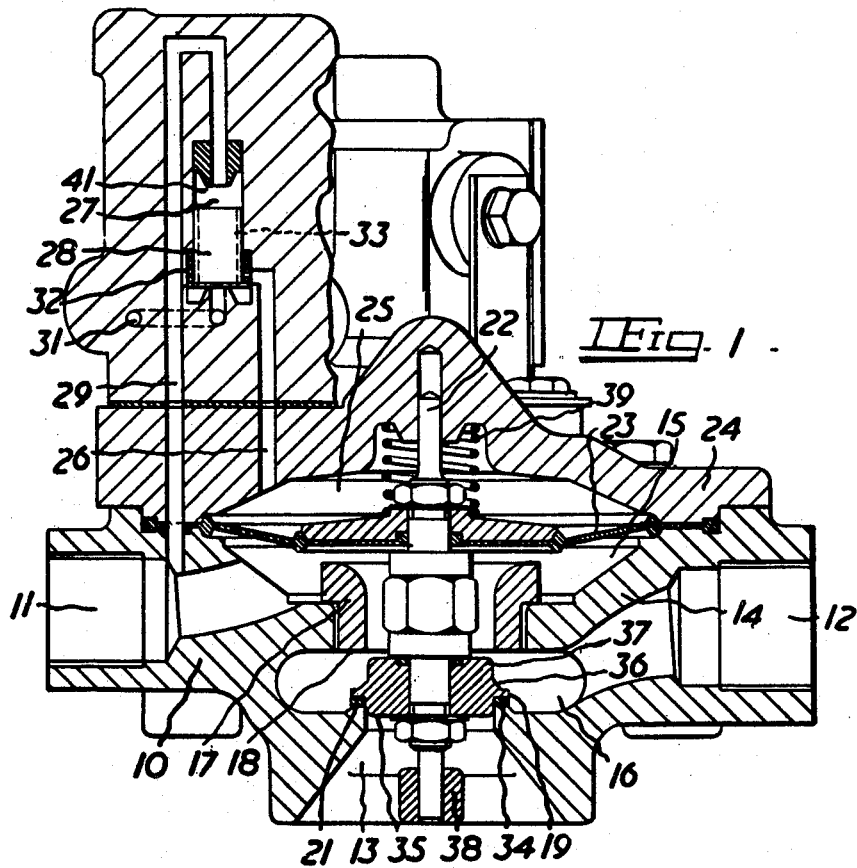
FIGURE 1 is a vertical section of the complete valve.

In the valve illustrated the valve body 10 has opposed horizontal inlet and outlet passages 11, 12 and a vertical exhaust or discharge port 13 leading to atmosphere.

The body is divided by a substantially horizontal partition 14 into an upper chamber 15 into which the inlet passage 11 leads and a lower chamber 16 in communication with the outlet passage 12. A sleeve 17 mounted in an opening in the partition in alignment with the port 13 provides on its lower end an annular seating 18 for a double beat valve head 19 operating between the seating 18 and an aligned annular seating 21 at the upper end of the port 13. The valve head is mounted on a vertical spindle 22 on which is mounted a diaphragm 23 closing the upper end of the body, the periphery of the diaphragm being clamped between a machined annular face on the body and a complementary face on a domed cover 24. The diaphragm is exposed on its lower face to the inlet pressure, and on its upper face to the pressure in a closed chamber 25 in the cover above the diaphragm. The chamber 25 is connected by a passage 26 to the lower end of a bore 27 in which works a pilot valve plunger 28 adapted selectively to connect the passage 26 and hence the chamber 25 to the inlet by way of a passage 29 or to atmosphere by way of a passage 31.

The valve plunger 28 is actuated by a solenoid (not shown) and in its normal position is held by a light spring 32 in the position illustrated in which the plunger engages a seating at the lower end of the bore to cut off communication between the passage 26 and atmosphere, the plunger having one or more longitudinal grooves 33 in its periphery through which the passages 26 and 29 are connected so that the chamber 25 is normally in communication with the inlet and the diaphragm is exposed on both sides to inlet pressure.

The valve head 19 has on its underside a washered annular face 34 adapted to engage the seating 21 around the exhaust port, and extending downwardly below that face is a short cylindrical extension or shroud 35 of a diameter slightly less than that of the opening within the seat.

On its upper side the valve head has a frusto-conical annular face 36 adapted to engage the seating 18 at the bottom end of the sleeve 17, and an upward extension or shroud 37 of a diameter slightly smaller than that of the bore in the sleeve.

The valve spindle is guided at its ends in a bore in the cover 24 and in a spider 38 in the exhaust port. The spindle is loaded by the weight of the valve assembly and by a compression spring 39 which normally holds the valve head in the position shown with the annular face 34 on its underside in engagement with the seating 21 and the upper end of the shroud 37 clear of the seating 18 so that fluid can flow freely from the inlet to the outlet through the bore in the sleeve 17. The pilot valve plunger 28 is in the position shown so that both sides of the diaphragm are exposed to the inlet pressure and the diaphragm does not affect the position of the valve head.

When the solenoid is energised the pilot valve plunger is raised into engagement with a seating 41 at the upper end of the bore 27 to cut off communciation through the passages 29 and 26 between the inlet and the chamber 25 and put that chamber into communication with atmosphere through the passages 31. The inlet pressure below the diaphragm then raises the diaphragm which takes with it the valve head until the valve head engages and closes the seating 18 and cuts off the supply of fluid to the outlet which is now connected to the exhaust port 13 by the movement of the valve head away from the seating 21.

The formation of the seating 18 on the sleeve 17 which is screwed into position allows the whole of the machining of the body to be effected from the upper side.

Figure 2:
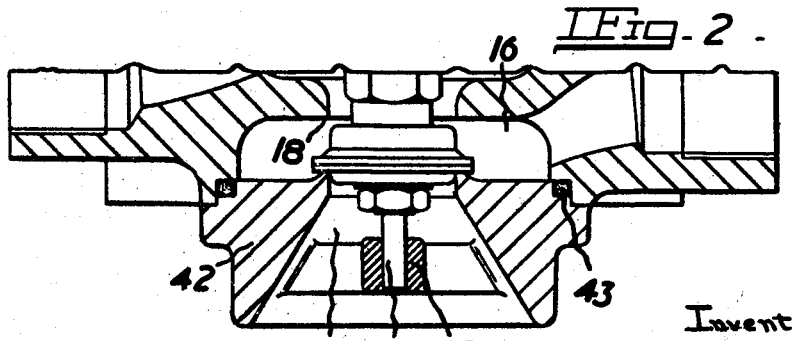
FIGURE 2 is a section of the lower part of the valve showing a modification.

In the alternative construction shown in FIGURE 2 the seating 18 is an integral part of the partition 14 and the exhaust port 13 and seating 21 are formed in a separate member 42 which is secured to the body and is sealed by an O-ring 43 which facilitates maintenance.

As the valve head moves upwardly the extension or shroud 37 on the upper end of the head enters the opening in the sleeve 17 and restricts the flow of fluid between the inlet and outlet passages before the head engages and closes the seating 18, and similarly when the valve head moves downwardly the extension or shroud 35 on the underside of the head enters and restricts the flow of fluid to exhaust before the head engages and closes the seating 21.

It will be appreciated that the lengths of the extensions or shrouds on the valve head can be selected to suit various operating conditions and that the areas of the openings provided are governed by the valve movement rather than by the valve area. For some operating conditions it may be desirable to provide an extension or shroud on only one side of the valve head.

In an alternative construction the diaphragm may be replaced by a piston coupled to the valve spindle and working in a cylinder of which one end is connected to the inlet and the other end to the bore in which the pilot valve works.

One important advantage of our improved valve is that it gives a positive action down to very low pressures of the order of 1 to 2 pounds per square inch.

For use in a fluid pressure braking system, incorporating means for preventing slipping of the wheels, the extension or shroud 37 on the upper side of the valve head may be of greater length than that on the lower side as shown in the drawing. Thus as the valve head moves upwardly towards the closed position, the upper extension or shroud 37 enters the sleeve 17 in the partition before the lower extension or shroud 35 leaves the exhaust opening and the supply of pressure on the under side of the diaphragm is maintained to complete the closing movement of the valve head and the valve is free from any tendency to flutter in an intermediate position. Further, as the valve head approaches the upper seat 18, it exposes a large opening to exhaust which ensures that the pressure in a cylinder or the like supplied with fluid from the valve outlet is reduced very rapidly.

A diagrammatic layout of the fluid pressure braking system incorporating means for preventing slipping of the wheels employing a valve as described above is shown in FIGURE 3 of the drawings.

In this layout 46 is a reservoir in which a supply of air under pressure is maintained and which is connected to the inlet 11 of the valve. The outlet 12 is connected to a brake cylinder 47 by which a brake is applied to a wheel, and the discharge or exhaust passage 13 is open to atmosphere.

A unit 48 sensitive to the rate of deceleration of the wheel controls any convenient form of relay in a control box 49 which in turn controls the energization of the solenoid actuating the pilot valve plunger 28.

When the brake is applied the valve head 19 is in the position shown and air under pressure has free access through the valve to the cylinder 47.

If the real conditions are such that the wheel is decelerated at an excessive rate the solenoid is energised to open the pilot valve and the valve head is moved up into engagement with the upper seating 18 to cut off the supply of compressed air to the brake cylinder 47 and connect the cylinder to exhaust so that the pressure in the cylinder is rapidly reduced and the brake is released before the wheel locks.

I claim:

1. A fluid control valve comprising a valve body, in which is formed an inlet passage, an outlet passage and an exhaust passage, opposed seatings in said valve body located respectively between said inlet passage and said outlet passage, and between said outlet passage and said exhaust passage, a valve head adapted to engage alternatively with said seatings, and a shroud on each side of said valve head and which throughout its axial length is of a constant section complementary to and smaller than the seating with which that side of the valve head is adapted to co-operate, whereby said shroud is adapted to enter said seating and restrict the flow of fluid through it before the valve closes.

2. A fluid control valve comprising a valve body in which is formed an inlet passage, an outlet passage and an exhaust passage, opposed seatings in said valve body located respectively between said inlet passage and said outlet passage, and between said outlet passage and said exhaust passage, a valve head adapted to engage alternatively with said seatings, and a cylindrical shroud on each side of said valve head and of which the diameter is less than that of the seating with which that side of the valve head is adapted to co-operate, whereby said shroud is adapted to enter said seating and uniformly restrict the flow of fluid through it before the valve closes.

3. A fluid control valve comprising a valve body in which is formed an inlet passage, an outlet passage and an exhaust passage, opposed seatings in said valve body located respectively between said inlet passage and said outlet passage, and between said outlet passage and said exhaust passage, a valve head adapted to engage alternatively with said seatings, and a cylindrical shroud on each side of said valve head and of which the diameter is less than that of the seating with which that side of the valve head is adapted to co-operate whereby said shroud is adapted to enter said seating and uniformly restrict the flow of fluid through it before the valve closes, and the axial length of the cylindrical shrouds are such that they can restrict flow through both seatings at the same time.

4. A fluid control valve as claimed in claim 3, wherein the cylindrical shroud on one side of the valve head is of a greater axial length than the shroud on the other side of said valve head.

5. A fluid control valve comprising a valve body in which is formed an inlet passage, an outlet passage, and an exhaust passage, opposed seatings in said valve body located respectively between said inlet passage and said outlet passage, and between said outlet passage and said exhaust passage, a valve head adapted to engage alternatively with said seatings, a cylindrical shroud on each side of said valve head and of which the diameter is less than that of the seating with which that side of the valve head is adapted to co-operate and the axial lengths of the shrouds are of such lengths that the shrouds can restrict flow through both seatings at the same time, a chamber in said valve body, a pilot valve adapted to connect said chamber alternatively to said inlet passage and to atmosphere, and a diaphragm located in said valve body for controlling the position of said valve head of which the diaphragm on one side is exposed to pressure in said inlet passage and on the other side is exposed to pressure in the chamber controlled by said pilot valve, whereby when the diaphragm on said other side is connected to atmosphere the valve head is moved in a direction to close the seating between said inlet passage and said outlet passage and the shroud on the side of the valve head which co-operates with that seating is adapted to enter said seating before the shroud on the other side of the valve head leaves the seating between said outlet passage and said exhaust passage, and the pressure in said inlet passage is maintained on said other side of said diaphragm to complete the closing movement of the valve head.

6. A fluid pressure braking system for vehicles comprising a reservoir containing a supply of fluid under pressure, means for applying a brake on a wheel of the vehicle, a fluid control valve comprising a valve body in which is formed an inlet passage connected to said reservoir, an outlet passage connected to said brake applying means, and an exhaust passage connected to atmosphere, opposed seatings in said valve body located respectively between said inlet passage and said outlet passage, and between said outlet passage and said exhaust passage, a valve head adapted to engage alternatively with said seatings, a cylindrical shroud on each side of said valve head and of which the diameter is less than the seating with which that side of the valve head is adapted to co-operate and the axial lengths of the shrouds are of such lengths that the shrouds can restrict flow through both seatings at the same time, a chamber in said valve body, a pilot valve adapted to connect said chamber alternatively to said inlet passage and to atmosphere, a diaphragm located in said valve body for controlling the position of said valve head of which the diaphragm on one side is exposed to pressure in said inlet passage and on the other side is exposed to pressure in the chamber controlled by said pilot valve, and a solenoid for actuating said pilot valve, a unit sensitive to the rate of deceleration of said wheel to control energisation of said solenoid, whereby when said wheel is decelerated at an excessive rate said solenoid is energised to open said pilot valve and connect the diaphragm on said other side to atmosphere and said valve head is moved in a direction to close the seating between said inlet passage and said outlet passage and cut off the supply of compressed air from said reservoir to said brake applying means, and simultaneously connect said brake applying means to exhaust, the shroud on that side of the valve head which co-operates with that seating being adapted to enter said seating before the shroud on the other side of the valve head leaves the seating between said outlet passage and said exhaust passage, and the pressure in said inlet passage being maintained on the other side of said diaphragm to complete the closing movement of said valve head.

No references cited.

EUGENE G. BOTZ, *Primary Examiner*.